United States Patent
Kreuk

(10) Patent No.: US 7,856,014 B2
(45) Date of Patent: Dec. 21, 2010

(54) HIGH CAPACITY MULTICAST FORWARDING

(75) Inventor: Volkert N M Kreuk, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 11/553,510

(22) Filed: Oct. 27, 2006

(65) Prior Publication Data

US 2008/0101350 A1   May 1, 2008

(51) Int. Cl.
  H04L 12/28   (2006.01)
(52) U.S. Cl. .................................................. 370/389
(58) Field of Classification Search ............ 370/389, 370/401, 254; 710/33
  See application file for complete search history.

(56) References Cited

U.S. PATENT DOCUMENTS

| | | | |
|---|---|---|---|
| 6,779,051 B1 * | 8/2004 | Basil et al. ................... | 710/33 |
| 7,486,659 B1 * | 2/2009 | Unbehagen et al. ......... | 370/351 |
| 2004/0165581 A1 * | 8/2004 | Oogushi .................... | 370/352 |
| 2004/0252722 A1 * | 12/2004 | Wybenga et al. ............ | 370/474 |
| 2005/0025069 A1 * | 2/2005 | Aysan ....................... | 370/254 |
| 2006/0147204 A1 * | 7/2006 | Yasukawa et al. ........... | 398/26 |

OTHER PUBLICATIONS

E. Rosen; Multicast in MPLS/BGP VPNs; Oct. 23, 2003; retrieved on Jul. 6, 2006; 17 pages. http://www.ietf.org/mail-archive/web-old/ietf-announce-old/Current/msg26847.html.
Pepelnjak, et al.; Using Multicast Domains—Enterprise Multicast in a Service Provider Environment; CISCO Press, Jun. 27, 2003; retrieved on Jul. 6, 2006; 3 pages; http://www.ciscopress.com/articles/article.asp?p=32100&seqNum=2&r1=1.
MPLS for Managed Shared Services—Q&A; retrieved Jul. 6, 2006; 7 pages. http://www.cisco.com/en/US/products/ps6604/products_qanda_item09186a00800b2cd7.shtml.

* cited by examiner

*Primary Examiner*—Ayaz R Sheikh
*Assistant Examiner*—Hai-Chang Hsiung
(74) *Attorney, Agent, or Firm*—Schmeiser, Olsen & Watts; William E. Schiesser

(57) ABSTRACT

A network, method, and a method of providing a service for multicast forwarding using multi-protocol label switching for a virtual private network in a public network. The network includes a first router, the first router being a provider edge multi-protocol label switching capable router, the first router including a virtual router connected to one or more second routers by tunnels, each second router of the one or more second routers being provider edge multi-protocol label switching capable routers; and a network connecting the first router to the one or more second routers.

29 Claims, 6 Drawing Sheets

US 7,856,014 B2

HIGH CAPACITY MULTICAST FORWARDING

RELATED APPLICATIONS

This Application is related to copending application, Ser. No. 11/553,495.

FIELD OF THE INVENTION

The present invention relates to the field of multicast routing; more specifically, it relates to a method, network and service to provide multicast forwarding in a public network offering virtual private network services using multi-protocol label switching.

BACKGROUND OF THE INVENTION

Traditional solutions allowing the transport of multicast traffic between multi-protocol label switching/virtual private networks in a public network for virtual private networks necessitates the use of an external routing device with one or more physical links to each of the interconnected multi-protocol label switched/virtual private networks. Drawbacks of this solution are the cost of the external routing device and the multicast forwarding limitations, particularly capacity, imposed by the information transport capacity of the physical links. This shortcoming of limited information transport capacity limits the practical size (e.g. number of locations, number of users) that may be included in a virtual-private network. Accordingly, there exists a need in the art to overcome the deficiencies and limitations described hereinabove.

SUMMARY OF THE INVENTION

A first aspect of the present invention is a multi-protocol label switching/virtual private network multicast capable network, comprising: a first router, the first router being a provider edge multi-protocol label switching capable router, the first router including an internal virtual router, the virtual router connected to one or more virtual private networks by tunnels; one or more second routers, each second router of the one or more second routers being provider edge multi-protocol label switching capable routers, each second router connected to the one or more virtual private networks; and a network connecting the first router to the one or more second routers.

A second aspect of the present invention is. a method of providing multi-protocol label switching/virtual private network multicast forwarding, comprising: providing a first router, the first router being a provider edge multi-protocol label switching capable router, the first router including an internal virtual router, the virtual router connected to one or more virtual private networks by tunnels; providing one or more second routers, each second router of the one or more second routers being provider edge multi-protocol label switching capable routers, each second router of the one or more second routers connected to the one or more virtual private networks; providing a network connecting the first router to the one or more second routers; receiving private network data and protocol information on the virtual router; directing the private network data and protocol information to at least one of the tunnels; within the tunnels, encapsulating the private network data within a public network transmission unit to generate a data packet; and multicasting the data packet over the network to at least one second router of the one or more second routers.

A third aspect of the present invention is a method of providing a service to a customer over a network, the service comprising: providing a network connecting a first router to one or more second routers, the first router and each second router of the one or more second routers being provider edge multi-protocol label switching capable routers; configuring the first router to include a virtual router and tunnels, the virtual router connected to each of one or more virtual private networks through the tunnels each second router connected to the one or more virtual private networks; receiving private network data and protocol information on the virtual router from the customer; directing the private network data and protocol information to at least one of the tunnels; within the tunnels, encapsulating the private network data within a public network transmission unit to generate a data packet; multicasting the data packet over the network to at least one second router of the one or more second routers; and providing a connection to each second router of the one or more second routers for a respective router of one or more third routers, each third router of the one or more third routers being a client edge router.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Terms and Definitions

Figure 1:
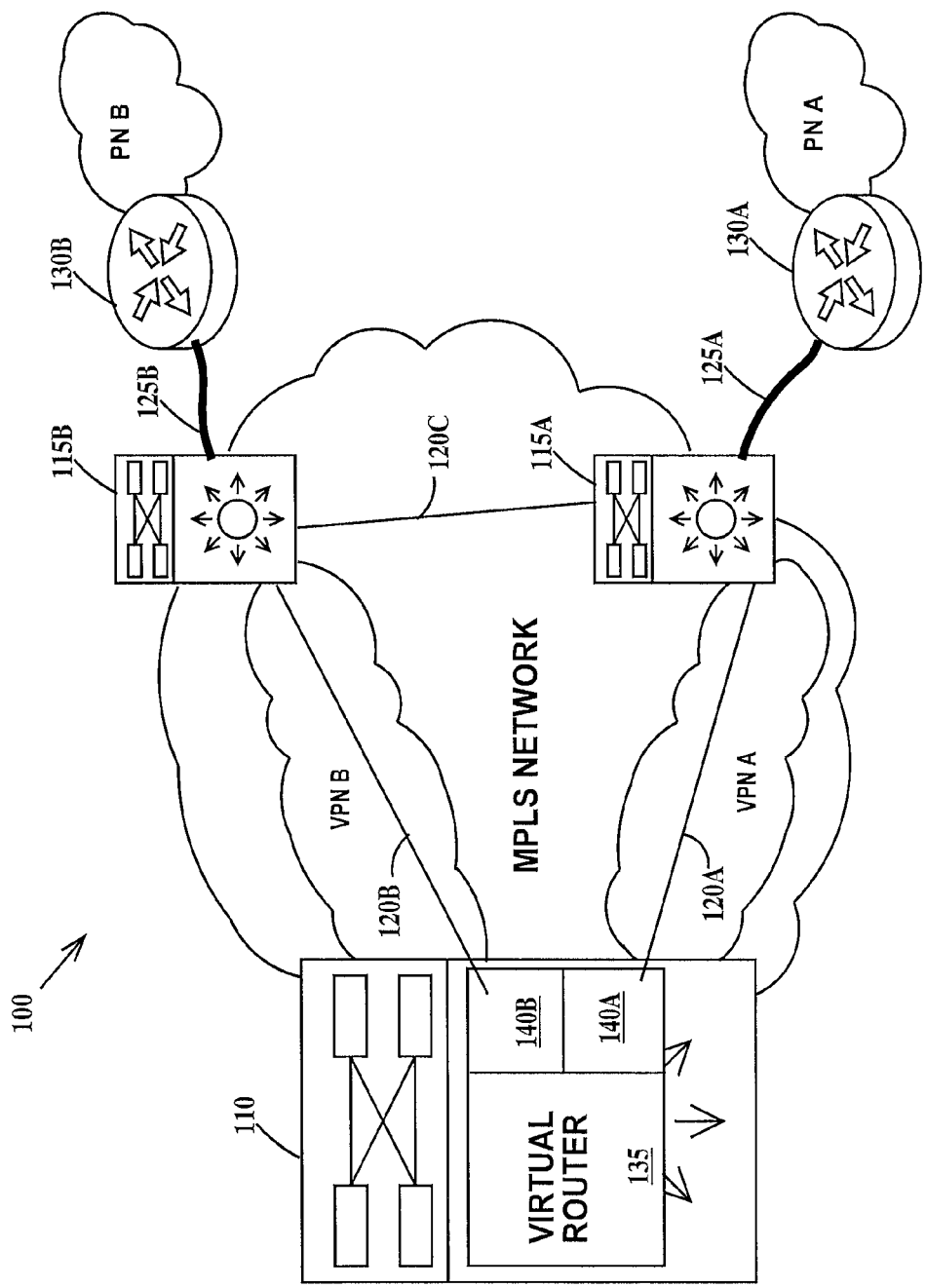
FIG. 1 is a schematic diagram of an MPLS/VPN multicast network according to a first embodiment of the present invention.

Multicast is the delivery of information to a group of selected destinations simultaneously, delivering messages over each link of the network only once and creating copies when the links to different destinations split. Multicast utilizes multicast destination address.

Multi-protocol label switching (MPLS) is a data carrying mechanism, which emulates some properties of a circuit-switched network over a packet-switched network. MPLS operates in the seven layer Open System Interconnection Reference Model (OSI Reference Model) computer network protocol model layer between the traditional Layer 2 (data link layer) and Layer 3 (network layer). MPLS works by pre-pending data packets with an MPLS header containing one or more labels. These packets are forwarded (i.e. switched) based on the labels.

A virtual private network (VPN) is a private communication network used to transfer information confidentially over a publicly accessible network. Examples of users of private communication networks include, but are not limited to government agencies, corporations, businesses and universities. Examples of public networks include, but are not limited to the Internet, Internet service providers (ISPs) and service provider private networks.

Tunneling is the transmission of data intended for use only within a private network through a public network in such a way that the routing nodes in the public network are unaware that the transmission is part of a private network. Tunneling is done by encapsulating the private network data and protocol information within the public network transmission units (e.g. packets containing an address and data) so that the private network protocol information appears to the public network as data. One example of tunneling is called generic routing encapsulation (GRE) tunneling. GRE tunneling protocol encapsulates arbitrary types of network layer packets inside arbitrary types of network layer packets. The original packet is the payload for the encapsulated packet. GRE tunnels are stateless, i.e. each tunnel end-point does not keep any information about the state of the remote tunnel end-point.

A router is a computer networking device that forwards data packets across a network toward their destinations, through a process known as routing. Routing occurs at the Layer 3 (network layer) of the OSI Reference Model. Routers that function as ingress and/or egress routers to a network using MPLS are called provider edge (PE) routers. Routers that connect a private network to a PE router are called client edge (CE) routers. Internal routers providing MPLS connectivity between non-adjacent provider edge routers MPLS are called provider (P) routers. Although general-purpose computers can perform routing, modern high-speed routers are highly specialised computers, generally with extra hardware added to accelerate both common routing functions such as packet forwarding and specialised functions such as encryption.

A virtual router is a software routing process (application) running on an operating system of a physical router or other computer device.

A backplane is a circuit board that connects several connectors in parallel to each other, so that each pin of each connector is linked to the same relative pin of all the other connectors, forming a bus.

Description of the Embodiments of the Invention

FIG. 1 is a schematic diagram of an MPLS/VPN multicast network according to a first embodiment of the present invention. In FIG. 1, a network 100 using MPLS, a MPLS capable PE first router 110, an MPLS capable second PE router 115A and an MPLS capable PE third router 115B. The high-speed multicast forwarding function is provided by first router 110. First router 110 is connected to second router 115A by a network path 120A. First router 110 is connected to third router 115B by a network path 120B. Second router 115A is connected to third router 115B by a network path 120C. In one example, network paths 120A, 120B and 120C are electrically conductive wires, optical cables, MPLS P routers, wireless connections or combinations thereof. In one example, network 100 is a public network. VPN A traffic between first router 110 and second router 115A and VPN B traffic between first router 110 and second router 115B can take any network path towards the destination node. Network paths 120A, 120B, and 120C can also be used for other, non-VPN traffic.

Connected to second router 115A by a connection 125A is a CE router 130A, which is connected to private network (PN) A. Connected to third router 115B by a connection 125B is a CE router 130B, which is connected to PN B. In one example, connections 125A, 125B and 125C are electrically conductive wires, optical cables, wireless connections or combinations thereof. PN A and PN B comprise the network of computers, printers, servers, and other hardware of the customer.

Included within first router 110, is a virtual router 135. A tunnel 140A is connected between virtual router 135 and MPLS network 100 and a tunnel 140B is connected between virtual router 135 and MPLS network 100. Tunnels 140A and 140B begin and end within first router 110. VPR 135 provides routing for data packets to tunnels 140A and 140B. The VPN A labeled cloud around network path 120A indicates that both routers 110 and 115 are capable of transmitting and receiving VPN A VPN (not public) data packets. VPN A VPN data packets sent from router 110 through tunnel 140A to second router 115A have been encapsulated as described supra. The VPN B labeled cloud around network path 120B indicates that VPN (and not public) data packets sent from router 110 through tunnel 140B to third router 115B have been encapsulated as described supra. In one example, tunnels 140A and 140B are GRE tunnels. Clouds VPN A and VPN B may be considered logical networks within MPLS network 100.

Currently, depending upon the router hardware used for first router 110, multicast forwarding transmission capacity from the first router can be in excess of 1 Terabits/sec compared to about n*10 Gbps for systems that rely on an external (to the network) inter-MPLS/VPN multicast router that is connected to the network by n 10 Gbps connections to the PE router of the network, where n is a whole positive number.

It is advantageous for practicing the embodiments of the present invention that there be one tunnel per VPN serviced from the router containing the tunnels. While only two VPN networks are illustrated in FIG. 1, any number of VPNs can be linked through router 110, each VPN having its own dedicated tunnel as illustrated in FIG. 2 and described infra.

It should be understood that MPLS PE routers and MPLS P routers are relative terms in a network environment and a single physical router can be both a MPLS PE router and a MPLS P router. For example, in FIG. 1, if network path 120B is not operational, VPN B traffic between router 110 and router 115B will be sent through network path 120A to router 115A and then along network path 120C to router 115B. Thus router 115A is MPLS P router for VPN B traffic while being a MPLS PE router for VPN A traffic.

Figure 2:
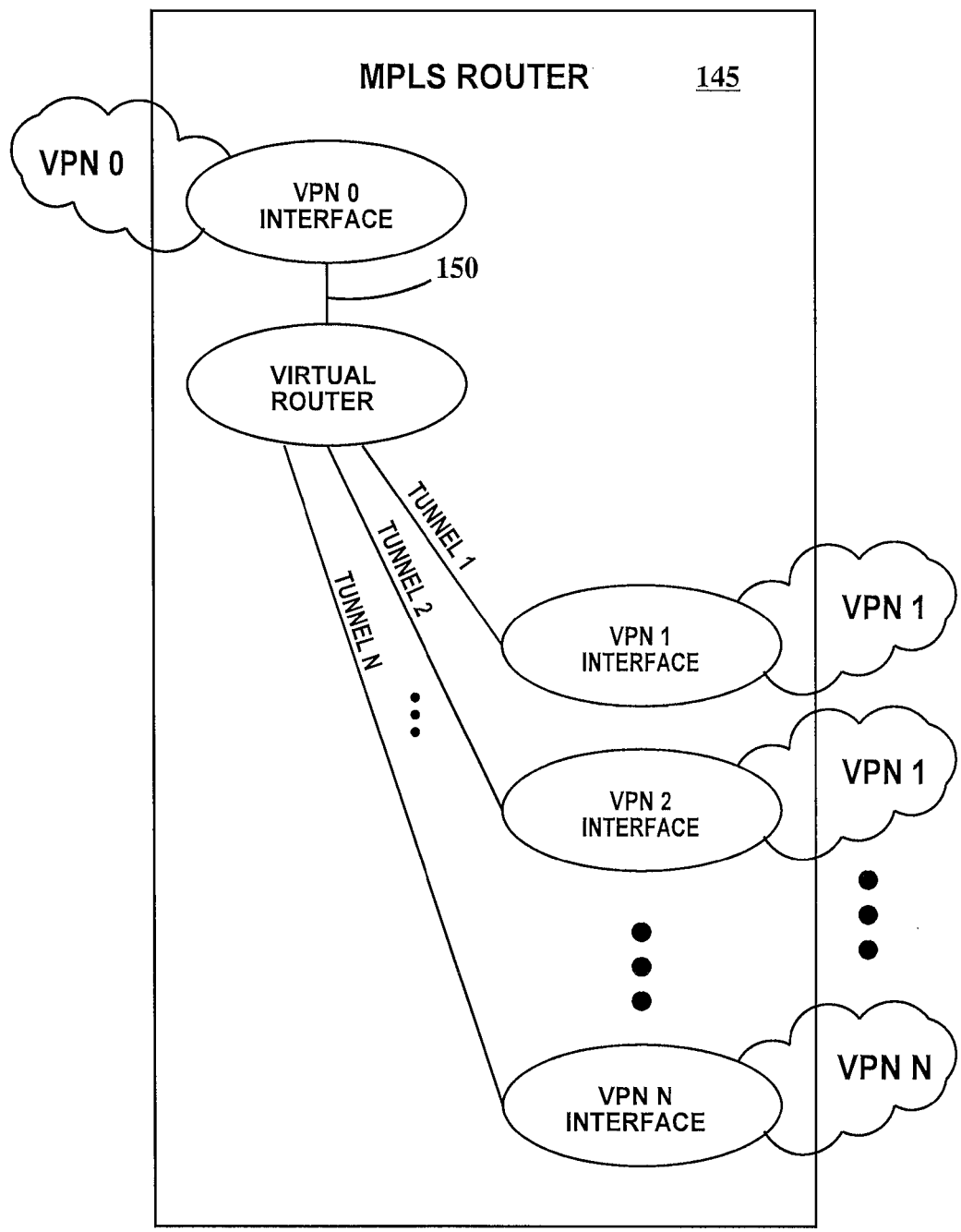
FIG. 2 is a schematic diagram of an MPLS router according to embodiments of the present invention.

FIG. 2 is a schematic diagram of an MPLS router according to embodiments of the present invention. In FIG. 2, an MPLS router 145 is exemplary of first router 110 of FIGS. 1 and 3. Router 145 includes a virtual router connected to VPN interfaces 1, 2 . . . N by tunnels 1, 2 . . . N, respectively. VPN interfaces 1, 2 . . . N are connected to respective logical VPN networks 1, 2 . . . N. Router 145 processor may optionally also include a VPN 0 connected between a VPN 0 and the virtual router by connection 150. Connection 150 may be a tunnel, a software link, a hardware link or combinations thereof. Without the connection to VPN 0, router 145 simply acts to link VPNs 1, 2 . . . N together. With the connection to VPN 0, information available on VPN 0 is available to VPNs 1, 2 . . . N and information from VPN 0 can be multicast to VPNs 1, 2 . . . N at the capacity of the backplane of router 145.

In one example, virtual router and tunnels 1, 2 . . . N are configured using the normal interface and operating system of router 145. In one example, tunnels 1,2 . . . N are GRE tunnels.

Figure 3:
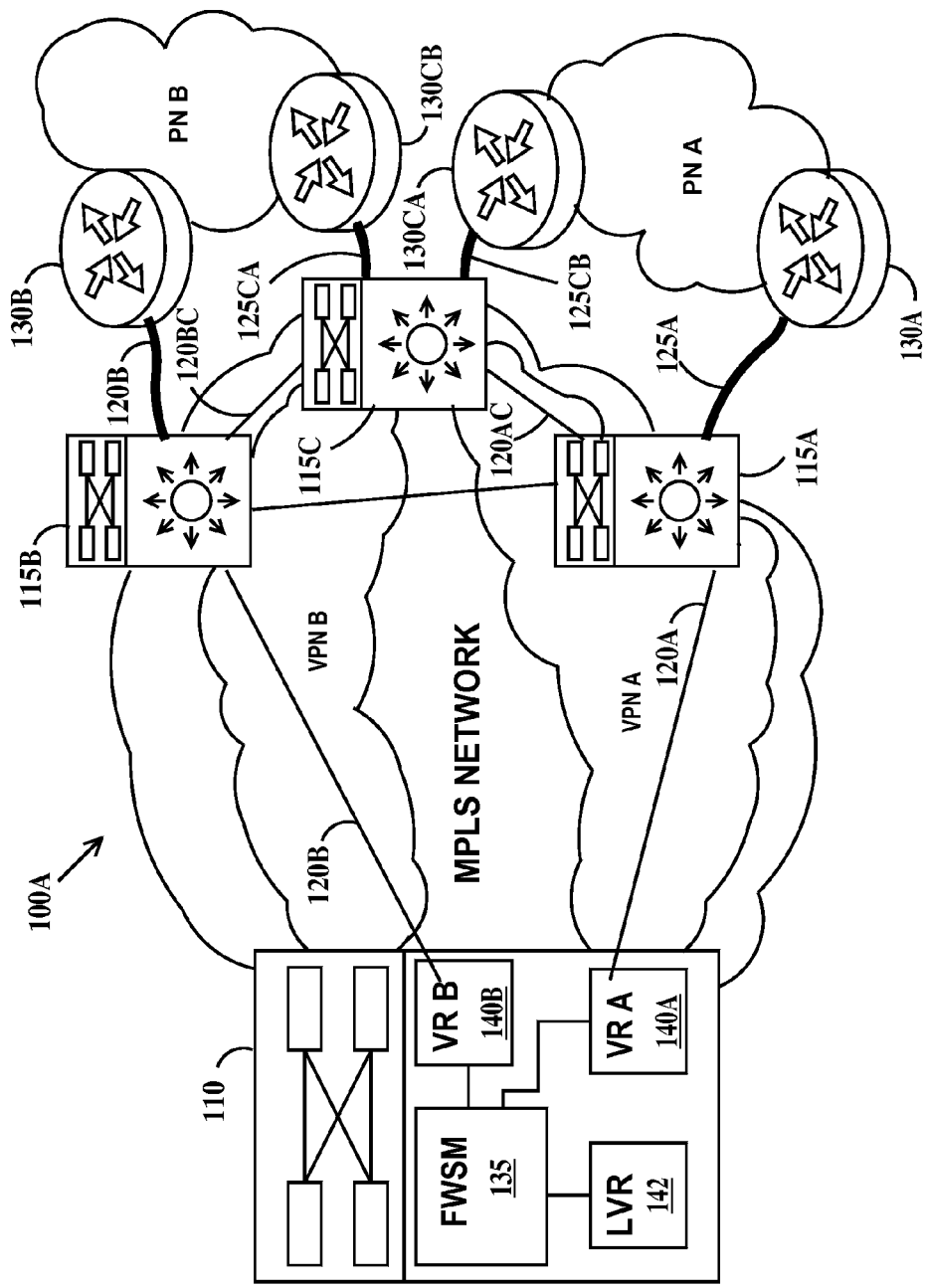
FIG. 3 is a schematic diagram of an MPLS/VPN multicast network according to a second embodiment of the present invention.

FIG. 3 is a schematic diagram of an MPLS/VPN multicast network according to a second embodiment of the present invention. In FIG. 3, an MPLS network 100A includes first router 110, second router 115A, third router 115B and a fourth MPLS capable PE router 115C. The primary difference between network 100A of FIG. 3 and network 100 of FIG. 1 is the addition of fourth router 115C. First router 110 is connected to second router 115A by a network path 120A. First router 110 is connected to third router 115B by a network path 120B. Second router 115A is connected to third router 115B by a network path 120C. Fourth router 115C is connected to second router 115C by network path 120AC and to third router 115B by network path 120BC. Again, any of the network paths 120A, 120B, 120C, 120AC and 120BC can be used to transport data for any of the VPNs. In one example, network paths 120A, 120B, 120C, 120AC and 120BC are electrically conductive wires, optical cables, MPLS P routers, wireless connections or combinations thereof. In one example, network 100A is a public network. Other public traffic may also use network paths 120A, 120B, 120AC and 120BC.

Connected to router 115A by connection 125A is CE router 130A, which is connected to PN A. Connected to router 115B by a connection 125B is CE router 130B, which is connected to PN B. Connected to router 115C by connection 125CA is a CE router 130CA, which is connected to PN A. Connected to router 115C by a connection 125CB is a CE router 130CB, which is connected to PN B. Router 115C provides an alternative network path to PN A and PN B. In one example, connections 125A and 125B, 125C, 125AC and 125BC are electrically conductive wires, optical cables, MPLS P routers, wireless connections or combinations thereof.

Figure 4:
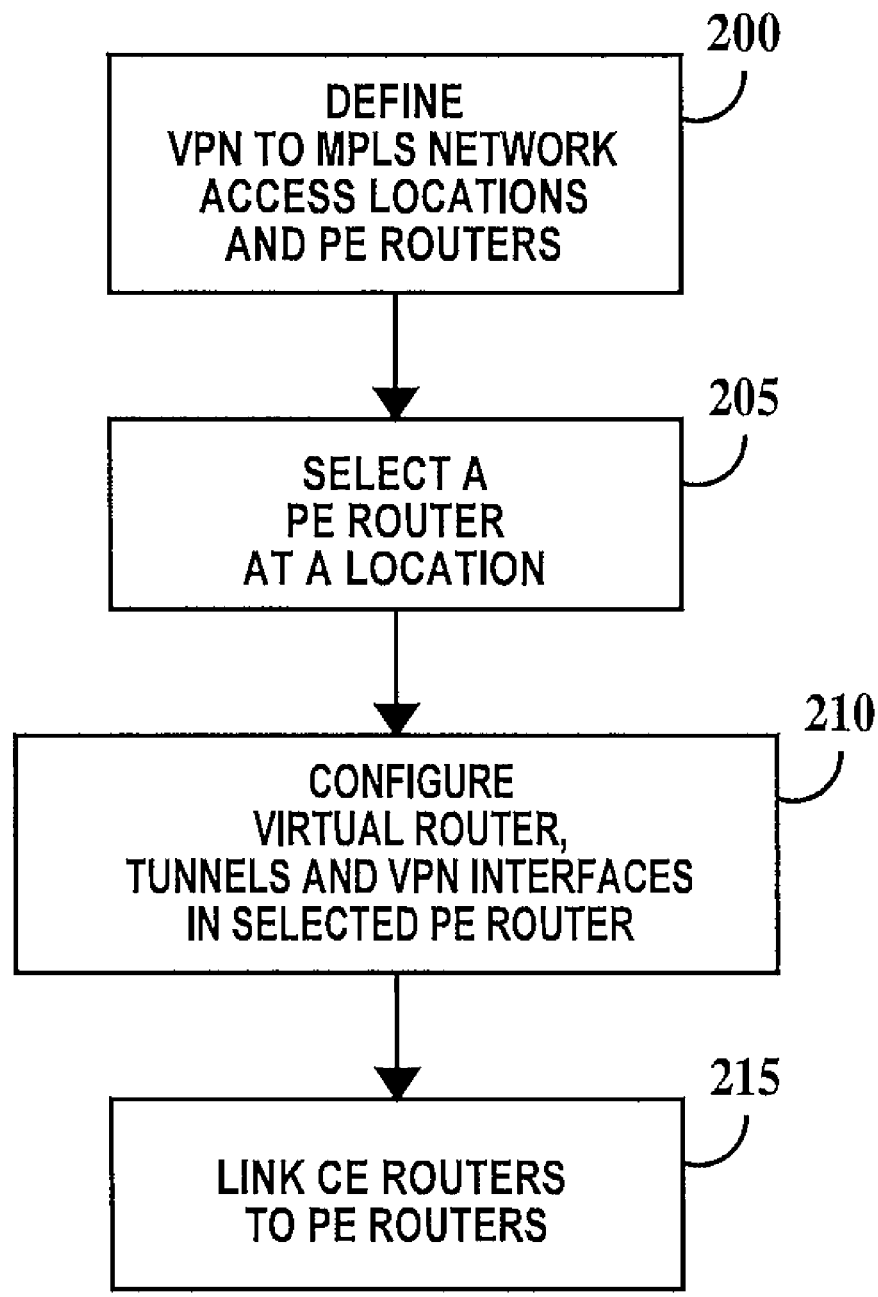
FIG. 4 is a flow diagram illustrating the method steps to set-up a network for MPLS/VPN multicast forwarding according to embodiments of the present invention.

FIG. 4 is a flow diagram illustrating the method steps to supply MPLS/VPN multicast forwarding according to embodiments of the present invention. In step 200, the VPN to MPLS network access locations are defined and PE routers at these points selected.

In step 205, the PE router that will do the inter-VPN multicast forwarding is selected.

In step 210, the selected PE router for multicast forwarding is configured with a virtual router, tunnels and a VPN interface for each VPN. The connections between the VPN interfaces and tunnels and between the tunnels and virtual router are "software" connections internal to the selected PE router. The virtual router is a software process provided by the PE router.

Configuration is through a user interface on the router. Configuration may be by entering instructions through a keyboard or by use or a mouse with a graphical interface or both. Alternatively, configuration instructions may be coded on a machine-readable media and the instructions loaded into the router.

In step 215, the CE routers linking the VPNs are connected to the network provider PE routers. These connections are electrically conductive wires, optical cables, wireless connections or combinations thereof.

Steps 200, 205, 210, and 215 may be performed by the network provider or steps 200, 205, and 210 may be performed by the service provider and step 215 by the customer (or VPN owner) with the network provider supplying a connection point to the customer. In one example, the network provider and the service provider are the same entity.

Figure 5:
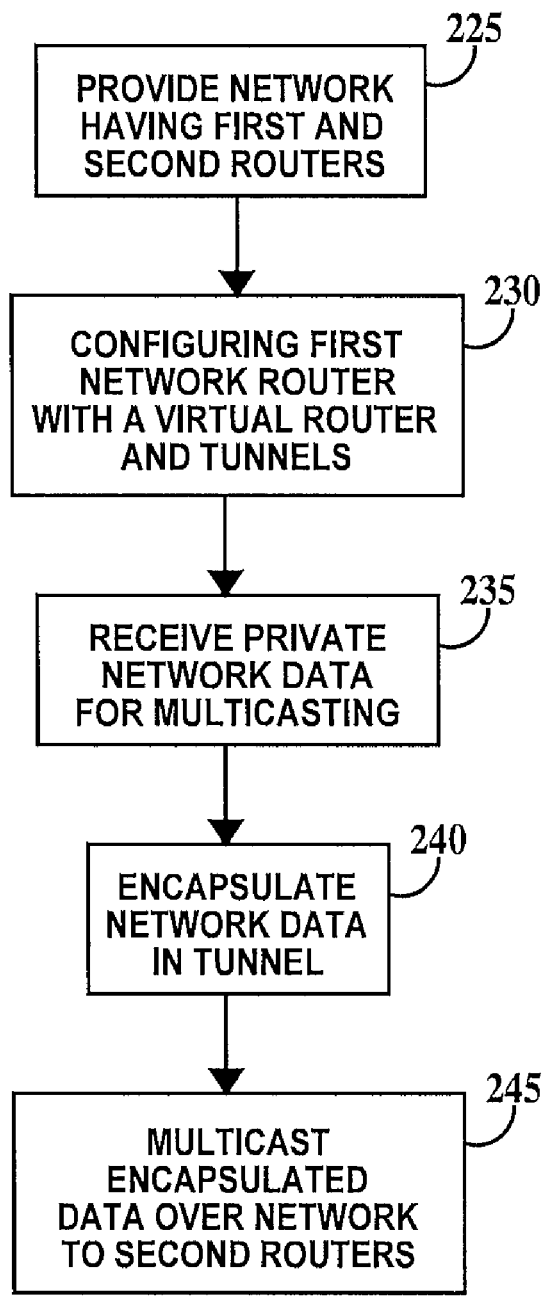
FIG. 5 is a flow diagram of a method of providing a service of multicast forwarding using multi-protocol label switching for a virtual private network according to embodiments of the present invention.

FIG. 5 is a flow diagram of a method of providing a service of multicast forwarding using multi-protocol label switching for a virtual private network according to embodiments of the present invention. In step 225, a network having a first router connected to one or more second routers is provided. Each of the first and second routers are provider edge multi-protocol label switching capable routers. In step 230, the first router is configured to include a virtual router and tunnels, the virtual router connected to each second router of the one or more second routers through a tunnel. The tunnels start and end in the first router and do not extend into the network. Data encapsulation (and de-capsulation) takes place in the first router only.

Next, in step 235, private network data and protocol information (e.g. from a customer) that is to be multicast is received on the virtual router. Then in step 240, the private network data and protocol information is directed to at least one of the tunnels and the private network data and protocol information is encapsulated within a public network transmission unit to generate a data packet. Finally, in step 245, the data packet is multicast over the network to at least one of the one or more second routers.

Once the multicast data is received by one of the PE second routers, it is transmitted to a CE router connected to a virtual private network (e.g. of the customer).

Figure 6:
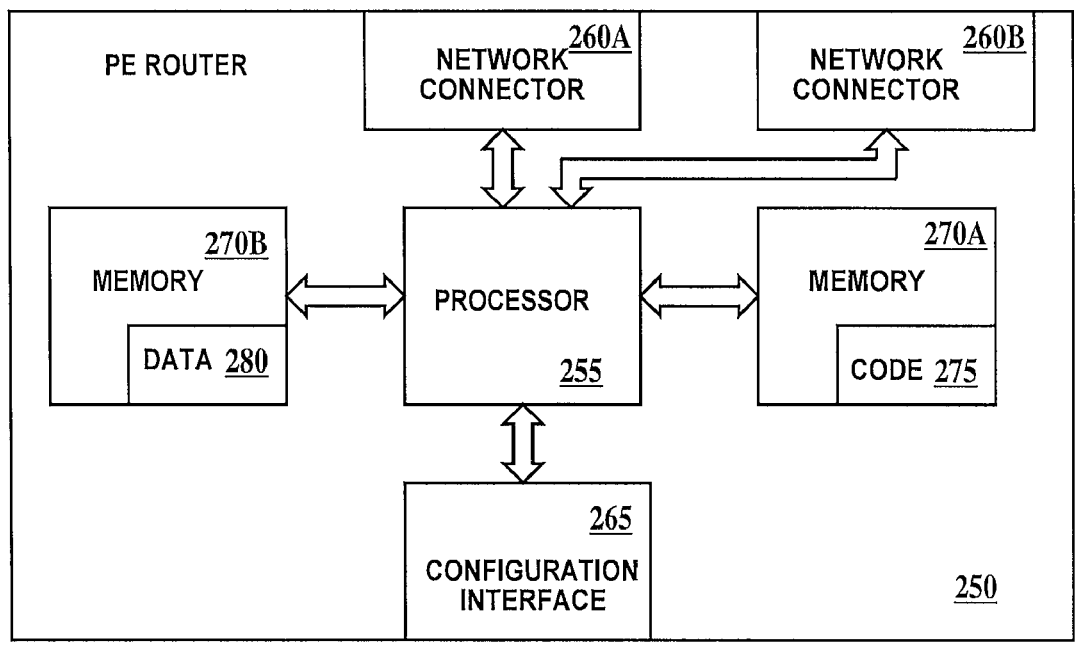
FIG. 6 is a schematic diagram of an exemplary PE router.

FIG. 6 is a schematic diagram of an exemplary hardware router 250 used for multicast forwarding using multi-protocol label switching for a virtual private network in accordance with embodiments of the present invention. Router 250 comprises a processor 255 (though only one processor is illustrated in FIG. 6, there may be multiple processors), network connections devices 260A and 260B coupled to processor 255, a configuration input device 265 coupled to processor 255, and memory devices 270A and 270B coupled to processor 255. Configuration input device 265 may be, inter alia, a keyboard, a mouse, etc. The memory devices 270A and 270B may be, inter alia, a hard disk, a floppy disk, a magnetic tape, an optical storage such as a compact disc (CD) or a digital video disc (DVD), a dynamic random access memory (DRAM), a read-only memory (ROM), etc. Memory device 270A includes a computer code 275, which is a computer program that comprises computer-executable instructions. The computer code 250 includes an algorithm for multi-protocol label switching for a virtual private network (e.g., as illustrated in FIG. 2 and described supra or as described in step 210 of FIG. 4). Processor 255 executes computer code 275. Memory device 270B includes input data 280. Input data 280 includes input required by computer code 275. Either or both memory devices 270A and 270B (or one or more additional memory devices not shown in FIG. 5) may be used as a computer usable medium (or a computer readable medium or a program storage device) having a computer readable program embodied therein and/or having other data stored therein, wherein the computer readable program comprises the computer code 275. Generally, a computer program product (or, alternatively, an article of manufacture) of router 250 may comprise said computer usable medium (or said program storage device).

Returning to FIGS. 1 and 3, any of the components of network 100 of the present invention could be deployed, managed, serviced, etc. by a service provider who offers to supply an inter-MPLS/VPN multicast forwarding service for a customer. Additionally, any of the components of customer VPNs as well as client edge routers connecting the client edge routers to the service providers network could be deployed, managed, serviced, etc. by a service provider who offers to set up an MPLS-VPN network for a client. Thus the present invention discloses a process for deploying or integrating computing infrastructure, comprising integrating computer-readable code into the router 110, wherein the code in combination with router 110 is capable of performing a method for inter-MPLS/VPN multicast forwarding.

In another embodiment, the invention provides a business method that performs the process steps of the invention on a subscription, advertising, and/or fee basis. That is, a service provider, such as a Solution Integrator, could offer to supply an inter-MPLS/VPN multicast forwarding service. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Thus, the embodiments of the present invention provide a method, network and service for very-high capacity inter-MPLS/VPN multicast forwarding.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A computer network comprising:
   a physical first router, said first router being a provider edge multi-protocol label switching capable router, said first router including an internal virtual router and two or more internal tunnels, said two or more internal tunnels beginning and ending within said first router, said virtual router directly connected to two or more virtual private network interfaces by respective tunnels of said two or more internal tunnels, each virtual private network interface of said two or more virtual private network interfaces connected to a respective virtual private network of two or more virtual private networks, said virtual router being a software routing process executable by an operating system of said first router;
   two or more physical second routers, each second router of said two or more second routers being a provider edge multi-protocol label switching capable router, each second router of said two or more second routers connected to a respective virtual private network of said two or more virtual private networks and directly connected to each other through a multi-protocol label switching network;
   said multi-protocol label switching network containing said two or more virtual private networks, said first router, and said two or more second routers;
   and wherein each tunnel of said two or more internal tunnels begins at said virtual router and ends at a respective virtual private network interface.

2. The network of claim 1, wherein each tunnel of said two or more internal tunnels is a dedicated connection between said first router and a different second router of said two or more second routers.

3. The network of claim 1, wherein each tunnel of said two or more internal tunnels is a generic routing encapsulation tunnel.

4. The network of claim 1, wherein said multi-protocol label switching network connecting said first router to said two or more second routers comprises electrically conductive wires, optical cables, multi-protocol label switching capable provider routers, wireless connections or combinations thereof.

5. The network of claim 1, further including:
   one or more third routers, each third router of said one or more third routers connected to a respective router of said two or more second routers.

6. The network of claim 1, further including:
   one or more third routers, each third router of said one or more third routers being a client edge router, each third router of said one or more third routers connected to a private network and to a respective router of said two or more second routers.

7. The network of claim 1, further including:
   a third router, said third router being a provider edge multi-protocol label switching capable router, said third router connected to at least two second routers of said two or more second routers through said multi-protocol label switching network.

8. The network of claim 1, further including:
   a third router, said third router being a provider edge multi-protocol label switching capable router, said third router connected to at least two second routers of said two or more second routers through said multi-protocol label switching network;
   one or more fourth routers, each fourth router of said one or more fourth routers being a client edge router, each fourth router of said one or more fourth routers connected between a respective private network of said two or more private networks and one or more routers of said two or more second routers; and
   one or more fifth routers, each fifth router of said one or more fifth routers being a client edge router, each fifth router of said one or more fifth routers connected to said third router and to a same private network of said two or more private networks as a corresponding router of said one or more fourth routers is connected to.

9. The network of claim 1, said first router further including an additional virtual private network interface connected to said virtual router.

10. The network of claim 1, wherein said multi-protocol label switching network is multicast capable.

11. the network of claim 1, wherein said first router comprises:
    first and second network connectors connected to a processor,
    a first non-transitory memory connected to said processor, said first non-transitory memory storing computer code that includes an algorithm for configuring said virtual router, said two or more internal tunnels, and said two or more virtual private network interfaces;
    a configuration interface connected to said processor; and
    a second non-transitory memory connected to said processor, said second non-transitory memory storing input data received by said configuration interface and useable by said computer code stored on said first non-transitory memory for configuring said virtual router.

12. A method, comprising:
    providing a physical first router, said first router being a provider edge multi-protocol label switching capable router, said first router including an internal virtual router and two or more internal tunnels, said two or more internal tunnels beginning and ending within said first router, said virtual router directly connected to two or more virtual private network interfaces by respective tunnels of said two or more internal tunnels, each virtual private network interface of said two or more virtual private network interfaces connected to a respective virtual private network of two or more virtual private networks, said virtual router being a software routing process running on an operating system of said first router;
    providing a multi-protocol label switching network;
    providing two or more physical second routers, each second router of said two or more second routers being a provider edge multi-protocol label switching capable routers, each second router of said two or more second routers connected to a respective virtual private network of said two or more virtual private networks and directly connected to each other through said multi-protocol switching network, said multi-protocol label switching network containing said two or more virtual private networks, said first router, and said two or more second routers;

receiving private network data and protocol information on said virtual router;

directing said private network data and protocol information to at least one tunnel of said two or more internal tunnels and encapsulating said private network data within a public network transmission unit to generate a data packet;

multicasting said data packet over said network to at least one second router of said two or more second routers; and wherein each tunnel of said two or more internal tunnels begins at said virtual router and ends at a respective virtual private network interface.

13. The method of claim 12, wherein each tunnel of said two or more internal tunnels is a dedicated connection between said first router and a different second router of said two or more second routers.

14. The method of claim 12, wherein each tunnel of said two or more internal tunnels is a generic routing encapsulation tunnel.

15. The method of claim 12, further including:

connecting one or more third routers to a respective router of said two or more second routers, each third router of said one or more third routers being a client edge router, each third router of said one or more third routers connected to a private network.

16. The method of claim 12, further including:

providing a third router, said third router being a provider edge multi-protocol label switching capable router, said third router connected to at least two second routers of said two or more second routers through said multi-protocol label switching network.

17. The method of claim 12, further including:

providing a third router, said third router being a provider edge multi-protocol label switching capable router, said third router connected to at least two second routers of said two or more second routers through said multi-protocol label switching network;

connecting one or more fourth routers, each fourth router of said one or more fourth routers being a client edge router, each fourth router of said one or more fourth routers connected between a respective private network of said two or more private networks and one or more routers of said two or more second routers; and connecting one or more fifth routers, each fifth router of said one or more fifth routers being a client edge router, each fifth router of said one or more fifth routers connected to said third router and to a same private network of said two or more private networks as a corresponding router of said one or more fourth routers is connected to.

18. The method of claim 12, said first router further including an additional virtual private network interface connected to said virtual router.

19. The method of claim 12, wherein said multi-protocol label switching network is multicast capable.

20. The method of claim 12, wherein said first router comprises:

first and second network connectors connected to a processor, a first non-transitory memory connected to said processor, said first non-transitory memory storing computer code that includes an algorithm for configuring said virtual router, said two or more internal tunnels, and said two or more virtual private network interfaces;

a configuration interface connected to said processor; and a second non-transitory memory connected to said processor, said second non-transitory memory storing input data received by said configuration interface and useable by said computer code stored on said first non-transitory memory for configuring said virtual router.

21. A method of providing a service to a customer over a computer network, the service comprising:

providing a multi-protocol label switching network containing two or more virtual private networks connecting a physical first router to two or more second routers, said first router and each second router of said two or more second routers being provider edge multi-protocol label switching capable routers, said two or more second routers connected to each other through said multi-protocol label switching network;

configuring said first router to include an internal virtual router and two or more internal tunnels, said two or more internal tunnels beginning and ending within said first router, said virtual router directly connected to two or more virtual private network interfaces by respective tunnels of said two or more internal tunnels, each virtual private network interface of said two or more virtual private network interfaces connected to a respective virtual private network of said two or more virtual private networks, said virtual router being a software routing process running on an operating system of said first router;

receiving private network data and protocol information on said virtual router from said customer;

directing said private network data and protocol information to at least one tunnel of said two or more internal tunnels and encapsulating said private network data within a public network transmission unit to generate a data packet;

multicasting said data packet over said network to at least one second router of said two or more second routers;

providing a connection to each second router of said two or more second routers for a respective router of two or more third routers, each third router of said two or more third routers being a client edge router; and wherein each tunnel of said two or more internal tunnels begins at said virtual router and ends at a respective virtual private network interface.

22. The method of claim 21, wherein each tunnel of said two or more internal tunnels is a dedicated connection between said first router and a different second router of said two or more second routers.

23. The method of claim 21, wherein each tunnel of said two or more internal tunnels is a generic routing encapsulation tunnel.

24. The method of claim 21, wherein each third router of said two or more third routers is connected to a private network of said customer.

25. The method of claim 21, further including:

providing a fourth router, said fourth router being a provider edge multi-protocol label switching capable router, said fourth router connected to one or more second routers of said two or more second routers through said multi-protocol label switching network.

26. The method of claim 25, further including:

providing connections for one or more fifth routers to said third router, each fifth router of said one or more fifth routers being a client edge router, each fifth router of said one or more fifth routers connected and to a same private network of said two or more private networks as a corresponding router of said one or more fourth routers is connected to.

27. The method of claim 21, said first router further including an additional virtual private network interface connected to said virtual router.

28. The method of claim 21, wherein said multi-protocol label switching network is multicast capable.

29. The method of claim 21, wherein said first router comprises:

first and second network connectors connected to a processor, a first non-transitory memory connected to said processor, said first non-transitory memory storing computer code that includes an algorithm for configuring said virtual router, said two or more internal tunnels, and said two or more virtual private network interfaces;

a configuration interface connected to said processor; and a second non-transitory memory connected to said processor, said second non-transitory memory storing input data received by said configuration interface and useable by said computer code stored on said first non-transitory memory for configuring said virtual router.

* * * * *